(12) United States Patent
Desa et al.

(10) Patent No.: US 6,786,087 B2
(45) Date of Patent: Sep. 7, 2004

(54) CONTROLLED THRUSTER DRIVEN PROFILER FOR COASTAL WATERS

(75) Inventors: Elgar Stephen Desa, Goa (IN); Prakash Mehra, Goa (IN); Gajanan Purushottam Naik, Goa (IN); Bailon Antonio Ehrlich Desa, Goa (IN); Rajachandran Madhan, Goa (IN); Antonio Manuel Dos Santos Pascoal, Lisboa Codex (PT)

(73) Assignee: Council of Scientific & Industrial Research (IN)

( * ) Notice: Subject to any disclaimer, the term of this patent is extended or adjusted under 35 U.S.C. 154(b) by 65 days.

(21) Appl. No.: 10/103,697

(22) Filed: Mar. 25, 2002

(65) Prior Publication Data

US 2003/0179652 A1 Sep. 25, 2003

(51) Int. Cl.[7] .................................................. G01N 9/00

(52) U.S. Cl. ............................... 73/170.34; 73/170.07; 73/170.11

(58) Field of Search ......................... 73/170.34, 170.07, 73/170.11

(56) References Cited

U.S. PATENT DOCUMENTS

| | | | | | |
|---|---|---|---|---|---|
| 3,147,431 A | * | 9/1964 | Bennet et al. | ............... | 324/706 |
| 3,354,658 A | * | 11/1967 | Leonardi | ..................... | 405/191 |
| 4,749,254 A | * | 6/1988 | Seaver | ....................... | 385/12 |
| 5,379,267 A | * | 1/1995 | Sparks et al. | ................. | 367/18 |

* cited by examiner

Primary Examiner—Edward Lefkowitz
Assistant Examiner—Jermaine Jenkins
(74) Attorney, Agent, or Firm—Piper Rudnick LLP; Stephen B. Kelber

(57) ABSTRACT

The present invention relates to a device useful as a controllable variable speed thruster-driven oceanographic profiler for coastal waters for measuring the vertical structure of chosen properties of the oceanic water column.

27 Claims, 3 Drawing Sheets

CONTROLLED THRUSTER DRIVEN PROFILER FOR COASTAL WATERS

FIELD OF THE INVENTION

The present invention relates to a device useful as a controllable variable speed thruster-driven oceanographic profiler for coastal waters for measuring the vertical structure of chosen properties of the oceanic water column.

BACKGROUND OF THE TECHNOLOGY

The best known method of profiling the properties of the ocean water column is the CTD (Conductivity-Temperature-Depth) system used widely in most modern oceanographic vessels. In these systems, CTD and other oceanographic sensors are mounted beneath a water sampling rosette ensemble, all of which can be lowered from the hydrographic winch on the ship. As the system moves through the water column, sensor data is transmitted through the winch wire to a shipboard data logger which also controls the sequence of closures of the sampling bottles on the rosette, and the storage of data. These devices are large, cumbersome and expensive to operate at sea, and in addition face the problem of the motion of the ship being coupled into the winch wire thereby possibly affecting the measurement process.

Early oceanographic profilers were first designed to measure ocean current flows. A variety of forms have evolved over several decades starting in 1965 with the free drop technique used by Richardson et al (W. S. Richardson and W. J. Schmitz (1965), "A technique for the direct measurement of transport with application to the Straits of Florida", J. Mar. Res., Vol 23, pp 172–185), then the wire guided profilers of Duing and Johnson (W. Duing and D. Johnson (1972), "High resolution current profiling in the Straits of Florida ", Deep-Sea Res., Vol 19, pp 259–274), the bottom mounted winch-based profiler of Walden and Collins (R. G. Walden and C. W. Collins (1984), "Bottom-mounted profiling winch "WHOI Technical Report No. 84, pp 1–13), the cyclic profilers by Honji et al (H. Honji, A. Kaneko, and K. Kawatate (1987), "Self-governing profiling system", Continental Shelf Research, Vol 7, No. 10, pp 1257–1265), and the Cartesian diver of Duda et al (T. F. Duda, C. S. Cox, and T. K. Deaton (1988) "The Cartesian Diver: A self-profiling Lagrangian velocity recorder", J. Atmos. Oceanic Technol, Vol 5, pp 16–33).

These early profilers were subsequently replaced by the untethered gravity driven type, which works, on the buoyancy principle for ascent or descent. Of noteworthy mention is the untethered oceanographic sensor platform developed by Hoyt and Bradley (U.S. Pat. No. 4,777,819), a torpedo shaped body which is made to free fall from a support ship. On reaching an appropriate depth, it drops an electromagnetically held ballast weight, turns around at that depth layer and then ascends under control of an interferometric homing system which guides it towards a homing beacon on a nearby vessel. On its descent the gravity profiler is negatively buoyant, and on ascent, syntactic foam cladding around the hull ensures positive buoyancy all the way up to the sea surface. The tail section of this profiler has control surfaces, which are steered by electrically operated actuators towards the recovery ship. The principal drawback of this device is that it requires special purpose deck gear on the support vessel and additional gear and homing gear equipment on a separate recovery vessel to operate effectively at sea. In addition, it would be cumbersome to operate this system in shallow coastal waters where the possibility of accidentally striking the seabed are higher than in open ocean waters.

The Autonomous Lagrangian Circulation Explorer (ALACE) is the most recent sub-surface profiler that cycles vertically from a depth where it is neutrally buoyant to the surface where it reveals its position and transmits profiled oceanographic data to the System Argos satellites. The ALACE uses buoyancy control to pump oil from an internal reservoir to an inflatable external bladder on its end-cap, thereby changing its volume, and buoyancy. Another version of the buoyancy controlled profiler is the Autonomous Oceanographic Profiler (U.S. Pat. No. 5,283,767) which has several elements in common with the ALACE system but claims the inclusion of an energy collection system which uses solar (photovoltaic) and electro-thermal (Peltier Effect) devices to charge onboard batteries. The latter system uses a moveable trim control piston to translate through a dive control cylinder which has the effect of altering the volume and hence the ballast of the profiler. The device includes Global Positioning System [GPS] capability and global bi-directional telecommunication facilities.

The profiling devices described above are based on the buoyancy principle wherein the volume of the said device is altered so as to control the buoyant force on it. A major drawback of most of these systems is that they are relatively slow compared to the present invention, and are best suited to applications in deep ocean waters. For example the ARGO floats will provide data over large spatial and temporal scales that will be used as input to global circulation models now being used to understand global climate problems. As a consequence, the number of pre-programmed descents is normally limited to 100 dives, and to maximum depth excursions of the order of 2000 dbar. The life span of these drifting profilers is typically 3 years. The ARGO or ALACE floats can be made to drift at any programmed depth before re-surfacing for a transmission burst.

The oceanographic profilers discussed above suffer from a common drawback, 'uncontrolled' variable motion through the water column. An illustration of this effect is shown in FIG. 1, which displays an actual velocity profile measured by a commercial free fall (or gravity-driven) optical profiler from a ship. A marked reduction in velocity results from a density mediated drag force is observed, when the profiler encounters a sub-surface plankton layer at about 12 m depth below the ocean surface (see * tag in FIG. 1). These effects are common in the coastal zones which display frequent stratification arising from sharp spatial gradients in ocean properties both in the horizontal (<100 m) and vertical (~0.5 m) planes. The non-constant velocity in profiling systems results in a loss of valuable data records particularly near the sea surface within the first 10 meters. Data corruption of surface records is also common observed in ship based CTD profiling systems which are heaved and pitched when wind swells and waves are present, or when the winch speed is non-constant. Likewise surface optical data in free fall profilers are invariably corrupted at the start of a dive when velocity changes are abrupt, when the profiler encounters a stratified layer (see above) or when it slows down at the end of a dive (as in FIG. 1)

The present invention obviates the drawbacks experienced in most profiling system by incorporating constant velocity control in profiler motion by a user set value. This new feature will result in clean non-corrupted data records at the surface and through the entire transect of the profiler motion. This is shown to be achieved here by an on-board controller system that receives a reference input from a speed sensor on the profiler, and automatically adjusts the revolutions per minute (rpm) to a small thruster motor riding piggy-back on one end-cap of the present profiler. The output of the controller ensures constant velocity motion of the present profiler irrespective of the presence stratified ocean layers, ocean currents, wind or wave conditions that would otherwise impose external disturbances on the motion of conventional profilers, and consequent corruption in data records as is described above.

SUMMARY OF THE INVENTION

The main object of the present invention is to provide a controlled thruster-driven oceanographic profiler for coastal water which obviates the drawbacks of passive buoyancy-controlled profilers and gravity-driven profiler described above.

Another object of the present invention is to provide a means to control the thruster motor to enable the profiler to execute its motion at any specified speed through the water column.

Still another object of the present invention is to include the means to halt the motion of the profiler at any user specified depth in the water column.

Yet another object of the present invention is to provide a control system to reverse the motor thrust so as to enable the profiler to ascend to the sea surface under motor control at constant speed.

BRIEF DESCRIPTION OF THE FIGURES

In the drawings accompanying this specification.

DETAILED DESCRIPTION OF THE INVENTION

Figure 1:
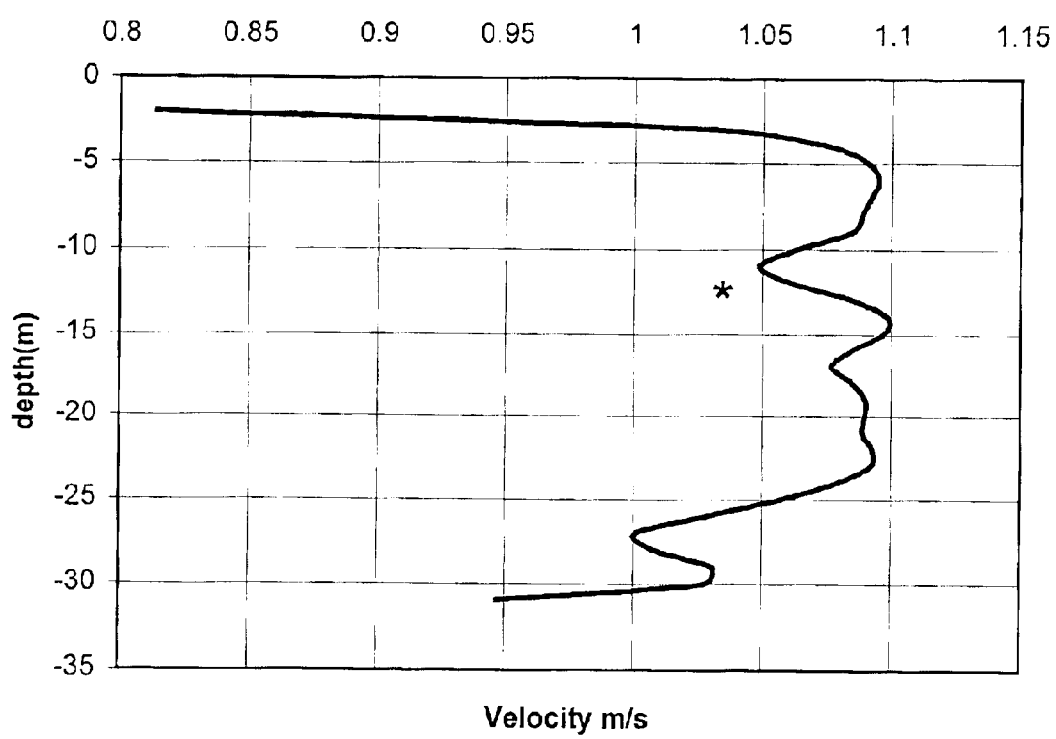
FIG. 1 represents a measured velocity profile of a free-fall radiometric profiler executing non-constant motion in coastal waters of Arabian Sea.

Accordingly, the present invention provides a controlled thruster driven profiler for profiling the properties of the ocean water, said profiler comprising a thruster motor mounted externally at an end of a cylindrical casing which is terminated by a parabolic nose at its other end, said cylindrical casing houses a power supply and an electronic circuit and is fitted with a pair of fixed fins at the end near to the thruster motor, plurality of sensors are mounted externally on the cylindrical casing for sensing various oceanographic parameters and said electronic circuit is connected to said sensors for receiving, storing, processing data received from said sensors and controlling the thruster motor.

In an embodiment of the present invention, said profiler is designed to be weakly positively buoyant.

In another embodiment of the present invention, the profiler incorporates positive buoyancy in its construction.

In still another embodiment of the present invention, the profiler may additionally incorporate special purpose foam buoyancy.

In yet another embodiment of the present invention, the thruster is fitted to the cylindrical casing using clamping means.

In a further embodiment of the present invention, the cylindrical casing is terminated by the parabolic nose to reduce drag forces when in motion.

In one more embodiment of the present invention, a series of batteries form the power supply.

In one another embodiment of the present invention, the batteries are arranged along the axis of the casing.

In an embodiment of the present invention, the fins are attached to the cylindrical casing so as to stabilize the profiler against rotational effects during its motion in water column.

In another embodiment of the present invention, the sensors may be selected from the group comprising of speed sensor, conductivity sensor, temperature sensor, water depth sensor, sea switch and pressure sensor.

In still another embodiment of the present invention, the temperature sensor may be mounted on the parabolic nose.

In yet another embodiment of the present invention, the sea switch may be mounted near the fins.

In a further embodiment of the present invention, the sea switch provides instant power to the profiler when it comes in contact with sea water.

In one more embodiment of the present invention, the conductivity sensor, speed sensor and water depth sensor may be mounted near the fins.

In one another embodiment of the present invention, said profiler may also include additional sensors other than the sensors specified above and said additional sensors may optionally be interfaced to the control system or can be interfaced to a data storage means.

In an embodiment of the present invention, the additional sensors may be used to determine vehicle performance parameters.

In another embodiment of the present invention, the profiler may include additional data storage means for storing the sensor and vehicle performance parameters while the profiler is in motion.

In yet another embodiment of the present invention, the electronic circuit consists of a linearised plant and a proportional-plus-integral (PI) controller.

In still another embodiment of the present invention, the electronic circuit determines the thrust that the motor should provide.

In a further embodiment of the present invention, the PI controller receives input from the speed sensor and outputs the control signal to the thrust motor.

In one more embodiment of the present invention, reliable failsafe features of the profiler are ensured during recovery by incorporating within the control structure means to halt the device in its upward ascent at a predetermined distance below the sea surface.

In one another embodiment of the present invention, the profiler ascends to water surface buoyantly without using power to avoid sudden impact with obstacles in its path below the sea as well as above the sea.

The present invention is further described with reference to the accompanying embodiments which are given for describing the invention in a detailed manner and therefore, should not be construed to limit the scope of the invention in any manner.

In a preferred embodiment, the present invention provides for a controlled thruster-driven oceanographic profiler for coastal waters which comprises of a thruster motor mounted externally on one end-cap of a meter long cylindrical casing which terminates at the other end in parabolic nose cone so as to reduce drag forces on the device when in motion; the said device is made to be positively buoyant and is fitted with sensors of speed, conductivity, temperature and depth (CTD) and a pair of fixed fins at the thruster end so as to stabilize it against rotational motion during its motion; power source for the device comprises of a stack of batteries around the axis of the casing providing thrust to the motor, and power to drive the electronics of the control systems and the sensors; the control system for the profiler consists of a linearised plant and a proportional-plus-integral (PI) controller that automatically determines the thrust to the motor so as to trim the system to a user programmed speed and by the provision of a speed sensor and the use of gain scheduling techniques to halt the profiler at any programmed depth, and thereafter to ascend to the sea surface by reversing the direction and magnitude of the thrust to a user specified speed.

In another embodiment of the present invention, the controller structure can be altered to bring the profiler to a complete halt at a programmed distance below the sea surface so as to ascend as a positively buoyant body without power thereby avoiding sudden impact with the deployment vessel or other unforeseen obstacles on or below the sea surface.

In still another embodiment of the present invention, foam buoyancy jacket can be provided to trim the buoyancy requirements of the profiler.

In yet another embodiment of the present invention, other depth dependent oceanographic parameters other than CTD can be measured by mounting related sensors on the nose cone of the profiler.

In still another embodiment of the present invention, the profiler includes a data storage means that is used to store the sensor data while the body is in motion through different depths.

In a further embodiment of the present invention, a sea switch is mounted near the profiler fins so as to sense its presence in seawater and thereby to power the electronics before implementing control systems on board.

When equipped with suitable oceanographic sensors, the profiler can be made to measure the vertical structure of chosen properties of the oceanic water column. The unthetered autonomous motion of the profiler under intelligent control of a thruster motor saves on expensive ship time, and enables oceanographic data to be obtained during descent and ascent maneuvers, and if desired, repeated profiles to be executed in the shortest possible time.

BEST MODE OF PERFORMING THE INVENTION

Figure 2:
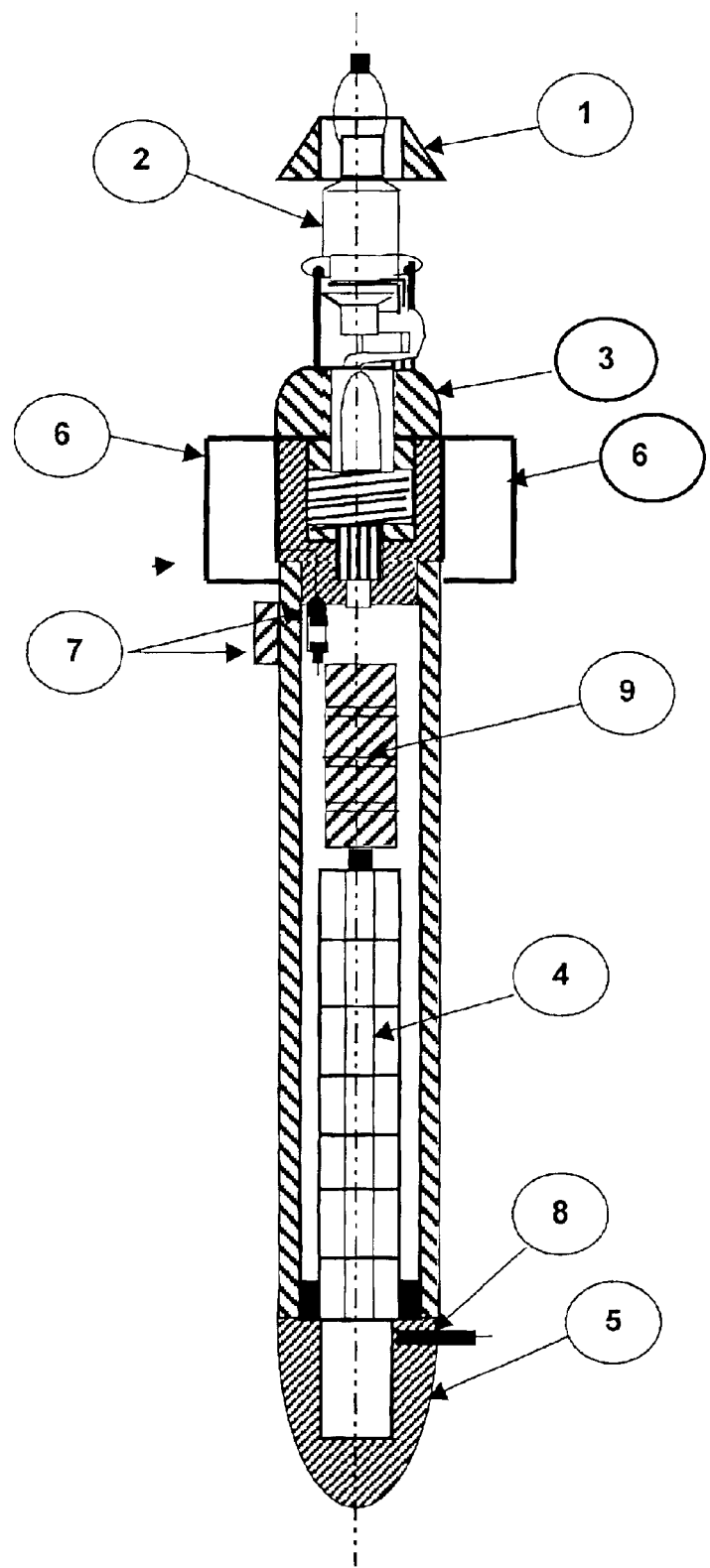
FIG. 2 represents a sectional view of the controlled thruster-driven profiler for coastal waters.

In a preferred embodiment of the present invention, the specifications of the controlled thruster driven profiler have been designed to produce a lightweight device with less than 20 kgs dry weight, producing a net positive buoyancy of less than 1 kg which automatically orients it vertically in sea water when not in motion. The natural built-in buoyancy eliminates the need to use special purpose syntactic foam cladding, as is necessary in other profiler types where buoyancy is the controlling factor on the motion of the body. The power source of the present device is contained within a pressure proof casing which is able to withstand depths in excess of 100 meters and which suffices for most shallow water applications. The position of the batteries act to bias the center of gravity of the body towards the nose cone as shown in FIG. 2. The estimated speed of the profiler is typically 2 m/s resulting in a total drag force less than 20 N with bollard outputs in the range 1 to 3 kgf. In motion, the profiler attains speeds greater than gravity-driven profilers with its nose pointing downwards to the seabed. At a programmed depth, the control system brings it to a halt, reverses the propeller thrust, which moves the device upwards with additional assistance provided by its natural buoyancy and without the need to change its orientation as is the case for the gravity profiler of Hoyt and Bradley (U.S. Pat. No. 4,777,819). The present invention can be deployed and retrieved from a small boat with a low free board of less than 2 meters. The deployment procedure involves dropping the device overboard which automatically powers up the device through a sea switch. The profiler can be seen when it reaches the sea surface, and retrieved with ease from the same vessel or boat using a net or boat hook.

The equation of motion which governs the dynamics of the present device can be expressed as:

$$M(dv/dt)+k_d(v^2)=k_t(n^2)+F_{wb} \tag{1}$$

where M is the sum total mass m and the added mass effect, v the speed of the center of mass of the profiler, $k_d$ and $k_t$ represent hydrodynamic coefficients, n is the speed of rotation of the propeller expressed in rpms, and $F_{wb}$ is the total net force from weight and buoyancy of the device. The drag force is $k_d(v^2)$, and the thrust force generated by the motor is $k_t(n^2)$ as shown in (1).

The equation (1) is non-linear and can be linearised about an equilibrium point $(v_0, n_0)$ with small perturbations $\delta v$ and $\delta n$ about this point to give:

$$(\delta v/\delta t)=-a\delta v+b\delta n \tag{2}$$

$$\text{where } a=(2k_d v_0)/M;\ b=(2k_t n_0)/M \tag{3}$$

A proportional plus integral (PI) controller and a linearised plant can be used to represent (2) as shown in FIG. 2. The perturbation '$\delta n$' of equation (2) can be represented by $$\delta n = \int k_I(\delta r - \delta v).dt + k_p(\delta r - \delta v) \tag{4}$$

where $\delta r$ is the reference velocity for $\delta v$ and $k_I$ and $k_p$ are the integral and proportional gains for the PI controller respectively. The transfer functions for the PI controller C(s) and the linearised plant P(s) are easily determined to be respectively:

$$C(s)=[k_i/s]+[k_p]$$

$$P(s)=b/(s+a)$$

The complete closed loop transfer function for the control system with velocity feedback uses the transfer functions C(s) and P(s) to give $$\frac{\delta V(s)}{\delta R(s)} = \frac{(k_i + k_p s)b}{s^2 + (a + k_p b)s + k_i b} \tag{5}$$

where $\delta V(s)$ and $\delta R(s)$ are the Laplace transforms for the speed $\delta V$, and the reference velocity $\delta R(s)$ respectively. The denominator of transfer function in (5) has the form of a second order system whose response can be sketched in terms of the natural frequency $\omega_n$, and the damping ratio $\xi$ in terms of the integral $k_I$ and proportional gains $k_p$ of the PI controller in (4), and the coefficients 'a' and 'b' which are related to the hydrodynamic coefficients $k_d$ and $k_t$. It is now possible to implement a control system by gain scheduling the PI coefficients $k_i$ and $k_p$ on any desired speed v (I. Kaminer, et al. 1995). The use of an integrator at the input to the plant P(s) determines the required rpm (revolutions per minute) to the motor to achieve a desired speed of the profiler.

FIG. 1 represents a measured velocity profile of a free fall radiometric profiler executing non-constant motion in coastal waters of the Arabian Sea. A kevlar cable which remains effectively decoupled to the profiler casing is pulled only when it becomes necessary to halt the profiler descent at about 30 m.

FIG. 2 represents a sectional view of the controlled thruster-driven profiler for coastal waters. The profiler comprises of a thruster motor [1] fixed onto a clamp [2], which in turn is mounted externally on the end-cap [3]. Batteries [4] are used to provide power to the thruster, and to the electronic circuit module [9] and to a speed and water depth sensors [7] which are mounted near the fins [6] or a temperature sensor [8] mounted on the parabolic shaped nose cone [5] of the profiler.

Figure 3:
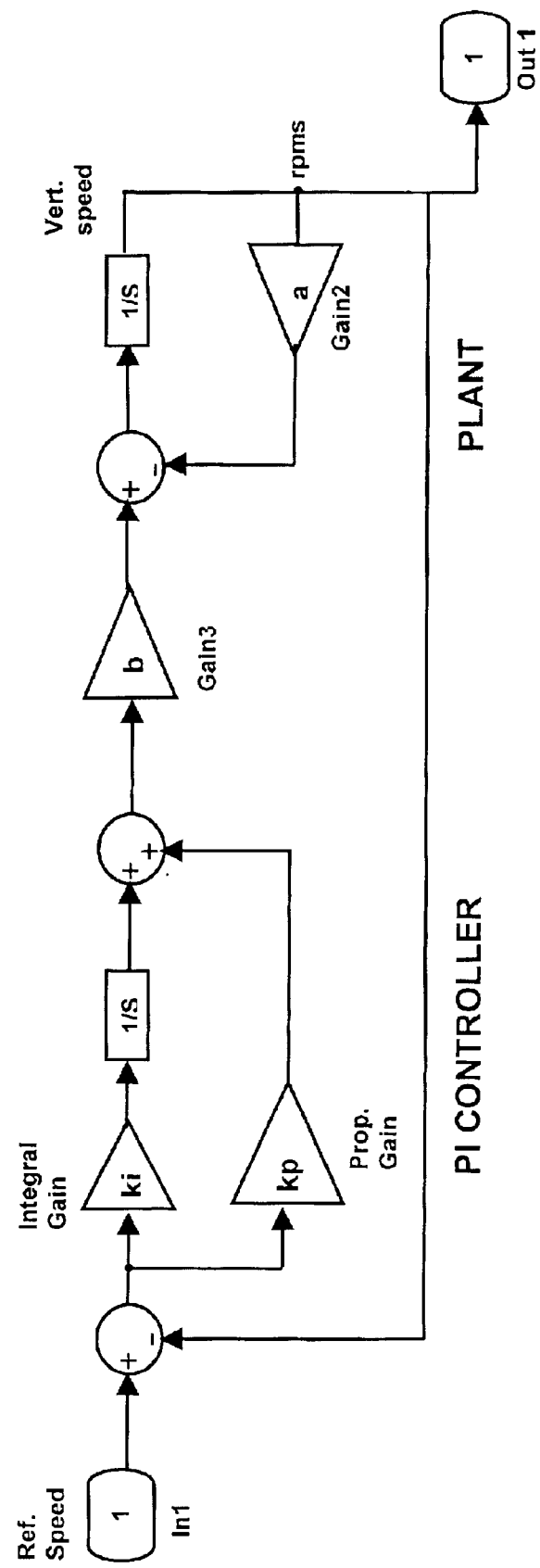
FIG. 3 represents the overall control system diagram of the profiler detailing the PI (proportional-plus-integral) controller and the plant.

FIG. 3 represents the overall control system diagram of the profiler detailing the PI (proportional-plus-integral) controller and the plant. In the implementation of the final control structure a speed sensor is required to monitor the profiler speed that is feedback to the summing junction of the controller section.

The main advantages of the present invention are:
1. The device of the present invention uses a thruster motor to achieve repeatable profiles of water column properties at a user specified constant profiling speed using the control structure outlined here. This is in contrast to gravity-driven or buoyancy profilers in which there is no control on the speed of the device, thus making it susceptible to natural perturbations from stratified waters, and to external forces from currents, waves and winds.
2. The constant velocity feature incorporated in the present invention results in clean non-corrupted data records through the complete water column transect of the profiler.
3. Data is collected during the downward and upward transects of the profile, thus ensuring that repeatability of data is obtained at no extra effort, if desired.
4. Being low cost and lightweight it can be quickly deployed and retrieved from a small boat or vessel with low free board, thus requiring no special purpose attachments for deployment. This advantage is especially useful in shallow coastal waters with depths in the range 15 m to 100 m.
5. No change in orientation of the device or turnaround motion of the profiler is required after maximum depth is realized (see the gravity driven profiler of Hoyt and Bradley (U.S. Pat. No. 4,777,819). The profiler reverses upwards to the sea surface when ascending.

What is claimed is:
1. A controlled thruster driven profiler for profiling the properties of the ocean water, said profiler comprising:
   a thruster motor mounted externally at an end of a cylindrical casing terminated by a parabolic nose at the other end, said cylindrical casing housing a power supply and an electronic circuit and said cylindrical casing being fitted with a pair of fixed fins at the end nearer to the thruster motor;
   one or more sensors mounted externally on the cylindrical casing for sensing one or more oceanographic parameters, wherein the sensors are at least one member selected from the group consisting of speed sensor, conductivity sensor, temperature sensor, water depth sensor, sea switch and pressure sensor; and
   an electronic circuit connected to said sensors for receiving, storing, or processing data received from said sensors and controlling the thruster motor.
2. The controlled thruster driven profiler of claim 1, wherein the profiler is designed to be weakly positively buoyant.
3. The controlled thruster driven profiler of claim 2, wherein the profiler incorporates positive buoyancy in its construction.
4. The controlled thruster driven profiler of claim 1, wherein the profiler incorporates special purpose foam buoyancy.
5. The controlled thruster driven profiler of claim 1, wherein the thruster is fitted to the cylindrical casing using clamping means.
6. The controlled thruster driven profiler of claim 1, wherein the cylindrical casing is terminated by the parabolic nose to reduce drag forces when in motion.
7. The controlled thruster driven profiler of claim 1, wherein a series of batteries form the power supply.
8. The controlled thruster driven profiler of claim 7, wherein the batteries are arranged along the axis of the casing.
9. The controlled thruster driven profiler of claim 1, wherein the fins are attached to the cylindrical casing so as to stabilize the profiler against rotational effects during its motion in water column.
10. The controlled thruster driven profiler of claim 1, wherein the temperature sensor is mounted on the parabolic nose.
11. The controlled thruster driven profiler of claim 1, wherein the sea switch is mounted near the fins.
12. The controlled thruster driven profiler of claim 11, wherein the sea switch provides power to the profiler when it comes in contact with sea water.
13. The controlled thruster driven profiler of claim 1, wherein the conductivity sensor, speed sensor or water depth sensor is mounted near the fins.
14. The controlled thruster driven profiler of claim 1, wherein said profiler also includes at least one additional sensor other than the sensors specified above and said additional sensor is optionally interfaced to the control system or to a data storage means.
15. The controlled thruster driven profiler of claim 14, wherein the at least one additional sensor is used to determine at least one vehicle performance parameter.
16. The controlled thruster driven profiler of claim 14, wherein the profiler incorporates data storage means for storing the sensor and vehicle performance parameters while the profiler is in motion.
17. The controlled thruster driven profiler of claim 1, wherein the electronic circuit consists of a linearized plant and a proportional-plus-integral (PI) controller.
18. The controlled thruster driven profiler of claim 17, wherein the electronic circuit determines the thrust that the motor provides.
19. The controlled thruster driven profiler of claim 17, wherein the PI controller receives input from the speed sensor and outputs the control signal to the thrust motor.
20. The controlled thruster driven profiler of claim 1, wherein a failsafe feature of the profiler is incorporated within the control structure a halting device to limit upward ascent to a predetermined distance below the sea surface.
21. The controlled thruster driven profiler of claim 20, wherein the profiler ascends to water surface buoyantly without using power to avoid sudden impact with obstacles.
22. A controlled thruster-driven profiler for coastal waters of comprising:

a thruster motor mounted externally on one end-cap of a meter long cylindrical casing which terminates at the other end in a parabolic nosecone so as to reduce drag forces on the device when in motion;

the profiler is made to be weakly positively buoyant and is fitted with sensors of speed, conductivity, temperature and depth and a pair of fixed fins at the thruster end so as to stabilize it against rotational effects during its motion in the water column;

a power source for the profiler comprises of a stack of batteries along the axis of the casing providing thrust to the motor, and power to drive the electronics of a control and the sensors;

the control system for the profiler comprising a linearized plant and a proportional-plus-integral (PI) controller that automatically determines the thrust to the motor so as to trim the system to a user specified speed and by the use of gain scheduling techniques and the provision of a speed sensor to halt the profiler at any programmed depth, and thereafter to ascend to the sea surface by reversing the direction and magnitude of the thrust to a user specified speed.

23. The profiler of claim 22, wherein failsafe features incorporated within the control structure provide means to halt the device, in its upward ascent, at a programmed distance below the sea surface, so as to ascend buoyantly without power thereby avoiding sudden impact with obstacles in its path to the sea surface.

24. The profiler of claim 22, wherein said profiler incorporates no special purpose foam buoyancy, but avoids the use of these materials by incorporating positive buoyancy into the profiler construction.

25. The profiler of claim 22, wherein said profiler includes a sea switch located near the fins that provides instant power to the profiler when in contact with seawater.

26. The profiler of claim 22, wherein said profiler includes a data storage means for storing all sensor and vehicle performance parameters while the profiler is in motion.

27. The profiler of claim 22, wherein said profiler includes additional sensors other than a Conductivity-Temperature-Depth sensor and the speed sensor, that can be interfaced to the control system without substantially affecting performance.

* * * * *